Patented Oct. 17, 1950

2,526,231

UNITED STATES PATENT OFFICE 2,526,231

5-PHENYL-5-PYRIDYL HYDANTOINS

Henry R. Henze, Austin, Tex., assignor to Parke, Davis & Company, Detroit, Mich., a corporation of Michigan No Drawing. Application October 21, 1946, Serial No. 704,794

8 Claims. (Cl. 260—296)

The invention relates to new hydantoin derivatives and methods for obtaining the same. More particularly, the invention relates to 5,5-disubstituted hydantoins where one of the two substituents at the 5-position of the hydantoin ring system is a phenyl radical and the other is a pyridyl radical attached by way of one of its ring carbon atoms to the 5-position of the hydantoin. The new compounds of the invention are 5-aryl-5-pyridyl substituted hydantoins having the general formula,

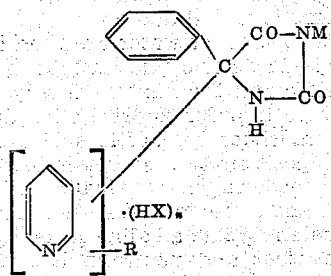

where R is a member of the class hydrogen and lower alkyl radicals, M is a member of the class consisting of hydrogen, alkali metals and alkaline earth metals, X is an anion of an organic or inorganic acid which forms a non-toxic soluble salt with the free base of said 5-aryl-5-pyridyl substituted hydantoins and $n$ is 0 or 1, being always 0 when M is alkali or alkaline earth metal and 0 or 1 when M is hydrogen. Many of the new compounds have anti-convulsant activity and they also serve as intermediates for the preparation of other pyridyl compounds.

The new compounds can be made by various methods but I prefer to react an aryl pyridyl ketone of formula,

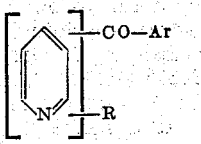

where Ar and R have the significance given above, with a system consisting of a soluble cyanide, ammonia, carbon dioxide and water in the presence of an inert organic solvent or suspending agent.

The reaction can be carried out at temperatures between the lower limit at which appreciable reaction occurs and the upper limit at which considerable decomposition of hydantoin product begins to occur. The optimum temperatures and times of heating for a given combination of reactants will vary, but can be readily determined by experiment. Ordinarily, temperatures between about 50° C. and 150° C. will suffice to give satisfactory yields of hydantoin products. Times of heating may vary from a few hours to a day or more.

The reactants can be used at atmospheric or higher pressures, depending upon the volatilities of the reactants and the inert organic solvents or suspending agents used as well as the temperatures employed. If higher boiling organic solvents and suspending agents are used, one can use higher temperatures without employing pressures above atmospheric. However, when using hydrogen cyanide as the water soluble cyanide, I prefer to use a closed system and in that case either atmospheric or higher pressures may be used.

Instead of using carbon dioxide and ammonia in gaseous form, one can use ammonium carbonate or like combination which is equivalent to $CO_2$ and $NH_3$ under the conditions of the reaction. For example, instead of using sodium cyanide or hydrogen cyanide under pressure of ammonia and carbon dioxide gases, one can employ ammonium cyanide and $CO_2$ or ammonium cyanide and ammonium carbonate at atmospheric or higher pressures, whichever is preferred for a given combination of materials and conditions.

The invention may be illustrated by the following examples, but the invention is not limited to the exact materials, conditions, times, temperatures, etc., which are given therein solely for purposes of illustration.

*Example I.*—160 grams of crude 2-benzyl pyridine is prepared from 300 grams of benzyl chloride and 200 grams of dry pyridine, using the method of Crook and McElvain, J. Am. Chem. Soc., 52, 4007 (1930). The desired 2-benzyl pyridine is obtained by extraction of the mixture with 4% hydrochloric acid (Overhoff and Wibaut, Rec. trav. chim. 50, 965 (1931)).

22.3 grams of 2-benzyl pyridine and 17.1 grams of freshly prepared selenium dioxide are dissolved in 200 cc. of dioxane and 10 cc. of water. This solution is heated to boiling with stirring for three hours and then filtered. Sulfur dioxide is bubbled through the solution, "norite" charcoal added and the mixture filtered. The filtrate is neutralized by addition of 10% sodium carbonate solution and the crude ketone extracted with benzene. The benzene extract is dried and fractionated to give 16.5 grams of phenyl-2-pyridyl ketone of boiling point 160-

163° C. at 7 mm. pressure from a bath heated to 215° C. The phenyl-hydrazone of this ketone melts at 135–137° C. (see Chem. Zentr., 73, I, 206 (1902)).

16.5 grams of phenyl 2-pyridyl ketone and 9.3 grams of potassium cyanide are dissolved in 300 cc. of 60% alcohol. This solution is placed in a glass lined monel metal bomb and mixed with 30 grams of ammonium carbonate cubes. The bomb is sealed and heated at 110° C. for 10 hours. At the end of 10 hours the bomb is cooled, opened and the reaction mixture evaporated to one-third its original volume and 100 cc. of water added. The solution is made strongly alkaline with sodium hydroxide and 2.0 grams of unchanged ketone is recovered by ether extraction. After neutralization of the ether extracted alkaline solution with 10% hydrochloric acid solution, it is chilled and the 5-phenyl-5-(2'-pyridyl) hydantoin removed by filtration. When recrystallized from 95% alcohol the hydantoin has a melting point of 234–235° C.

The hydantoin free base of this example has the formula

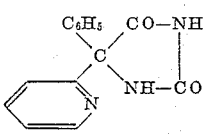

It has an activity as an anticonvulsant of about the same order as 5,5-di-phenyl hydantoin and has the added advantage that it can be converted to its acid addition salts with organic and inorganic acids of the formula HX, whereby concentrated as well as dilute aqueous solutions of such salts suitable for oral use or for intravenous or other hypodermic injection can be prepared. Thus, by dissolving one molar proportion of the hydantoin free base of the last formula given above in anhydrous ether and bubbling dry hydrogen chloride gas through the ether solution, a precipitate of the hydrochloride is formed and can be filtered off, washed with dry ether and dried. The dry product can then be dissolved in water.

Instead of neutralizing the hydantoin free base of this example with hydrogen chloride, it may be reacted with another non-toxic organic or inorganic acid, such as sulfuric, lactic or citric acid, to form a water soluble acid addition salt. Furthermore, the free base can be reacted with or neutralized by an equivalent of alkali metal or alkaline earth metal base such as sodium hydroxide, sodium carbonate or calcium hydroxide, to get the corresponding metal salt of the free base. When the reaction is carried out in aqueous or alcoholic solution the metal salt solution is evaporated to dryness in order to obtain the salt. It is thus apparent that the invention embodies not only the free base forms of the new aryl pyridyl hydantoins but also their metal salts and acid addition salts.

*Example 2.*—18 grams of phenyl 3-pyridyl ketone and 11 grams of potassium cyanide are dissolved in 200 cc. of 60% ethyl alcohol and then mixed with 32 grams of U. S. P. ammonium carbonate in a sealed container and the mixture heated at 110° C. for 21 hours. The container is cooled, opened, the reaction mixture poured out and evaporated to about one half of its volume and 100 cc. of water added. The aqueous solution is made strongly alkaline, for example with sodium hydroxide, and any unchanged ketone removed by solvent extraction using a water immiscible solvent for the ketone such as ether.

The ether extracted alkaline aqueous solution is neutralized by adding dilute hydrochloric acid solution. The neutralized solution is chilled and filtered to remove the crystalline 5-phenyl-5-(3'-pyridyl) hydantoin which separates out. Recrystallized from 95% alcohol and dried, this hydantoin has a melting point of 229–230° C. Its hydrochloride can be prepared as described for the hydrochloride of Example 1 and has a melting point of 255–257° C. (with decomposition). The sulfate and lactate, likewise prepared from sulfuric and lactic acids, respectively, also are well defined crystalline products.

*Example 3.*—The ketone intermediate for this example is phenyl 4-pyridyl ketone and is obtained by oxidation of 4-benzyl pyridine by means of selenium dioxide in the same manner as given for preparation of phenyl 2-pyridyl ketone from 2-benzyl pyridine under Example 1.

29.4 grams of phenyl 4-pyridyl ketone of melting point 71°–72° C. are dissolved in 200 grams of fused acetamide, 13 grams of potassium cyanide added and the mixture stirred until solution is complete. 60 grams of ammonium carbonate U. S. P. cubes, are then added and the mixture enclosed in a steel bomb having a glass liner and the bomb heated for 24 hours at 140° C. The reaction mixture can be heated in an open container at about 55–60° C. to cause reaction and formation of the hydantoin but in general yields are lower than at 140° C. and the time of heating must be extended greatly.

The bomb is cooled and opened after 24 hours at 140° C. 500 cc. of water are then added, followed by hydrochloric acid until the solution becomes acidic and the mixture finally boiled and concentrated in order to drive off hydrogen cyanide and much of the acetic acid derived from the decomposition of the acetamide. The concentrate is cooled, made alkaline with sodium hydroxide and extracted with ether to remove unreacted ketone. The alkaline layer is separated from the ether and neutralized carefully with dilute hydrochloric acid to precipitate 5-phenyl-5-(4'-pyridyl) hydantoin. The latter is recrystallized from alcohol to give the pure crystalline free base compound of formula,

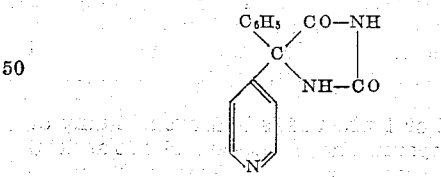

*Example 4.*—A Grignard reagent is prepared from 15 grams of magnesium and 90 grams of bromobenzene in anhydrous ether. To this there is added at a rate sufficient to maintain constant reflux a solution in anhydrous ether of 35.4 grams of 6-methyl-3-cyano-pyridine, prepared for example as described by R. Graf et al., J. prakt. Chem. 150, 153–165 (1938) (C. A. 32; 4582 (1938)) by reaction of POCl₃ on the amide of 6-methyl-nicotinic acid. It is refluxed for 2 hours after all the cyano compound is added and then hydrolyzed by hydrochloric or sulfuric acid solution. The aqueous phase is neutralized with dilute sodium bicarbonate solution and the ether layer removed and dried over anhydrous sodium sulfate. After distilling off the ether the ketone is obtained by fractionation.

20 grams of the 3-(6-methyl pyridyl) phenyl ketone thus obtained is dissolved in 200 grams of fused acetamide and 13 grams of potassium cyanide added. As soon as solution of the cyanide is complete 30 grams of ammonium carbonate is added and the container (a glass lined steel bomb) is closed. The bomb is heated at 110 to 140° C. for 18 hours, cooled and the contents treated with 450 cc. of water. The mixture is filtered to obtain a portion of the desired hydantoin. The filtrate is made strongly acidic by the addition of hydrochloric acid and boiled to decompose the acetamide and concentrate the solution. The concentrate is exactly neutralized by adding ammonium hydroxide solution and chilled. The chilled mixture is filtered to obtain more of the desired hydantoin product. The product is of a high grade but can be further purified by solution in dilute alkali followed by addition of dry ice (solid $CO_2$) to precipitate the hydantoin free base which is filtered off and dried. The hydantoin free base of this example has the formula,

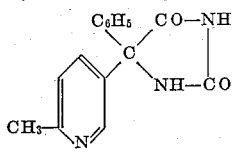

The free base can be reacted with an equivalent amount of an alkali metal or alkaline earth metal hydroxide or alcoholate to form alkali and alkaline earth salts, or with an equivalent of an acid such as hydrochloric, sulfuric, lactic, tartaric or benzoic acid, and after separating alcohol, water or other solvent used and drying, a solid salt is obtained.

What I claim as my invention is:

1. Phenyl pyridyl hydantoin compounds of formula,

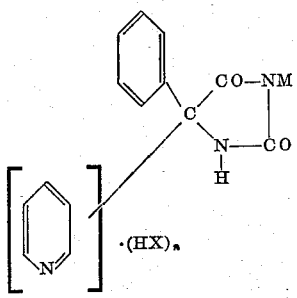

where M is a member of the class consisting of hydrogen, alkali metals and alkaline earth metals, X is an anion of an acid which forms a non-toxic soluble acid-addition salt with the free base of said hydantoin, and $n$ has one of the values 0 and 1, being always 0 when M is one of said metals and being one of the values 0 and 1 when M is hydrogen.

2. 5-phenyl-5-(2'-pyridyl) hydantoin and its alkali metal salts, alkaline earth metal salts and acid-addition salts with acids which form non-toxic soluble salts therewith.

3. 5-phenyl-5-(3'-pyridyl) hydantoin and its alkali metal salts, alkaline earth metal salts and acid-addition salts with acids which form non-toxic soluble salts therewith.

4. 5-phenyl-5-(4'-pyridyl) hydantoin and its alkali metal salts, alkaline earth metal salts and acid-addition salts with acids which form non-toxic soluble salts therewith.

5. The hydrochloride acid-addition salt of 5-phenyl-5-(2'-pyridyl) hydantoin.

6. The hydrochloride acid-addition salt of 5-phenyl-5-(3'-pyridyl) hydantoin.

7. The hydrochloride acid-addition salt of 5-phenyl-5-(4'-pyridyl) hydantoin.

8. An acid addition salt of 5-phenyl-5-(2'-pyridyl) hydantoin.

HENRY R. HENZE.

REFERENCES CITED

The following references are of record in the file of this patent:

UNITED STATES PATENTS

| Number | Name | Date |
|---|---|---|
| 2,409,755 | Henze | Oct. 22, 1946 |

FOREIGN PATENTS

| Number | Country | Date |
|---|---|---|
| 566,094 | Germany | Dec. 14, 1932 |
| 602,218 | Germany | Sept. 3, 1934 |
| 642,794 | Germany | Feb. 25, 1937 |

OTHER REFERENCES

Biltz et al.: Berichte, 44, 411–412 (1911).

Rigler and Henze: J. Am. Chem. Soc. 58, 474 (1936).

Magee and Henze, J. Am. Chem. Soc. 60, 2148 (1938).

Henze et al.: J. Am. Chem. Soc. 63, 3360 (1941).

Henze et al.: J. Am. Chem. Soc. 63, 1936–1938 (1941).

Hartman: California Medicine, 66, 242–248 (1947).

Sollmann: Manual of Pharmacology, page 681, W. B. Saunders Co., Philadelphia (1948 edition).

Sidgwick: Organic Chemistry of Nitrogen, page 522.